Feb. 2, 1937. G. N. HANSON 2,069,246
LABEL AFFIXING MACHINE
Filed Dec. 7, 1934 5 Sheets-Sheet 1

Fig. 1

INVENTOR
Glen N. Hanson
BY HIS ATTORNEYS
Merchant and Kilgore

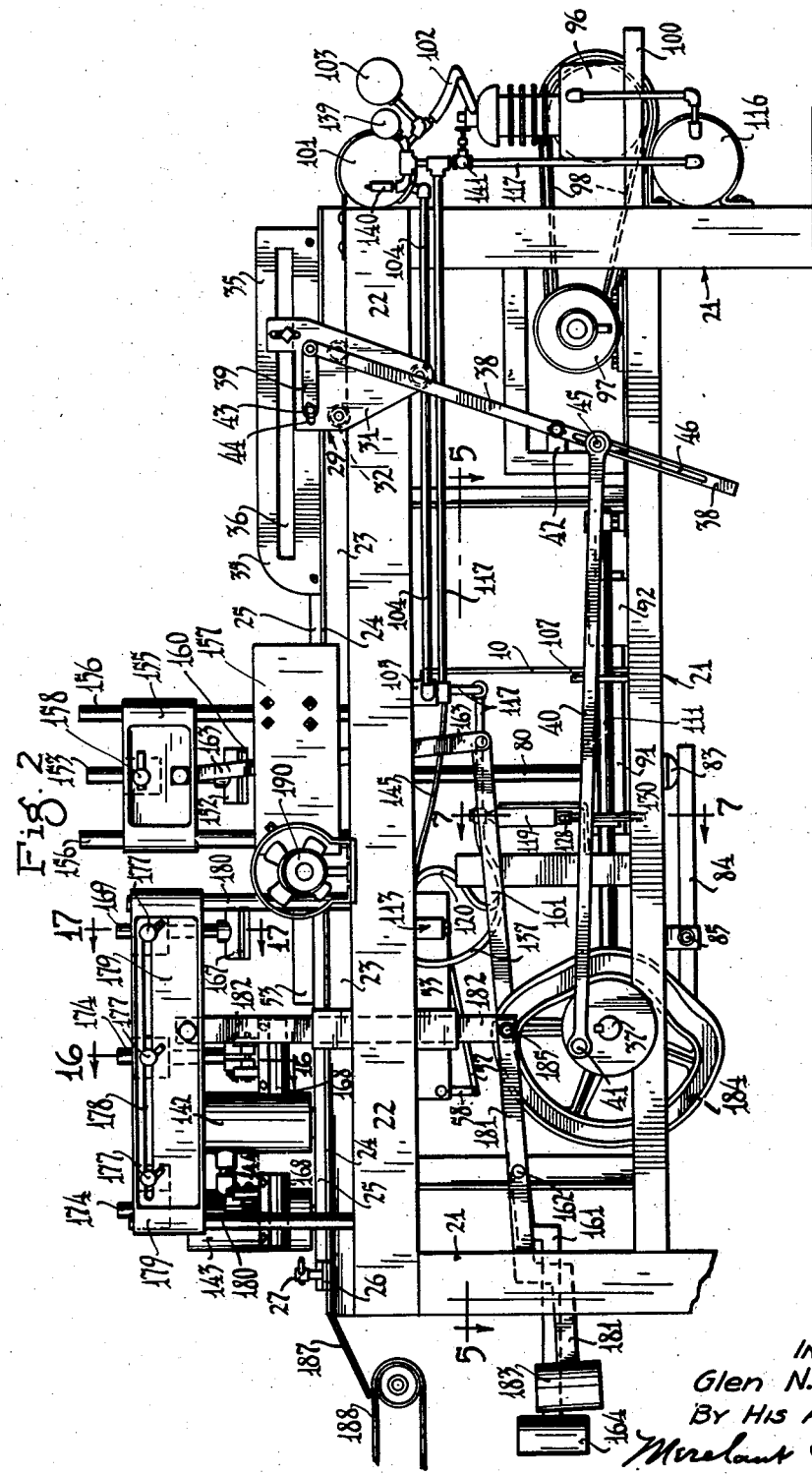

Feb. 2, 1937. G. N. HANSON 2,069,246
LABEL AFFIXING MACHINE
Filed Dec. 7, 1934 5 Sheets-Sheet 3
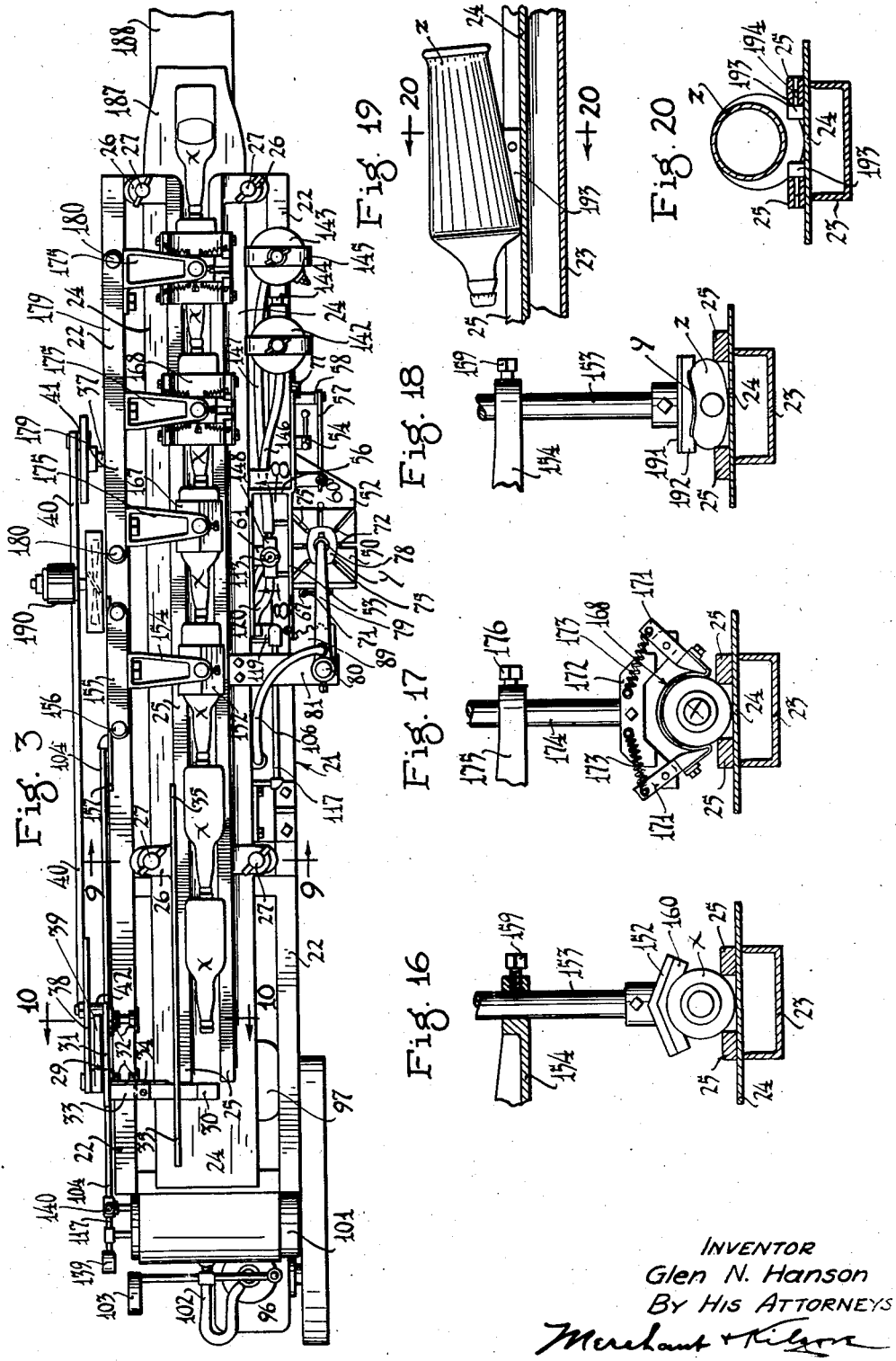
INVENTOR
Glen N. Hanson
BY HIS ATTORNEYS Feb. 2, 1937.    G. N. HANSON    2,069,246
LABEL AFFIXING MACHINE
Filed Dec. 7, 1934    5 Sheets-Sheet 4
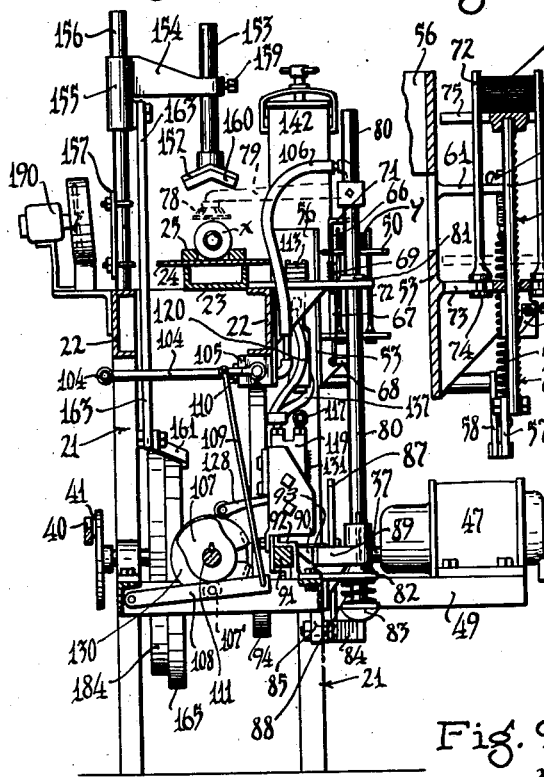
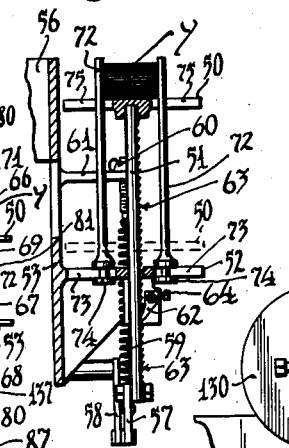
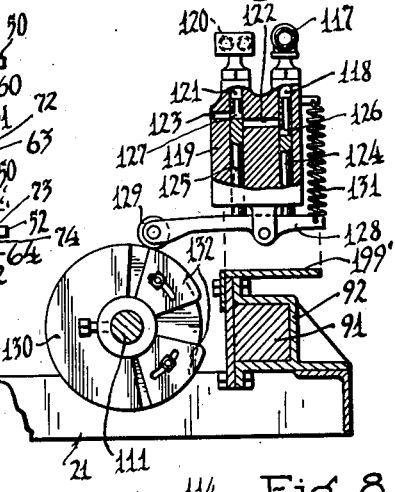
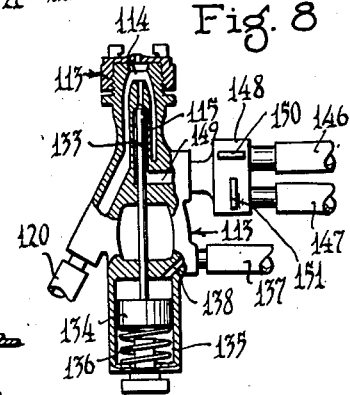
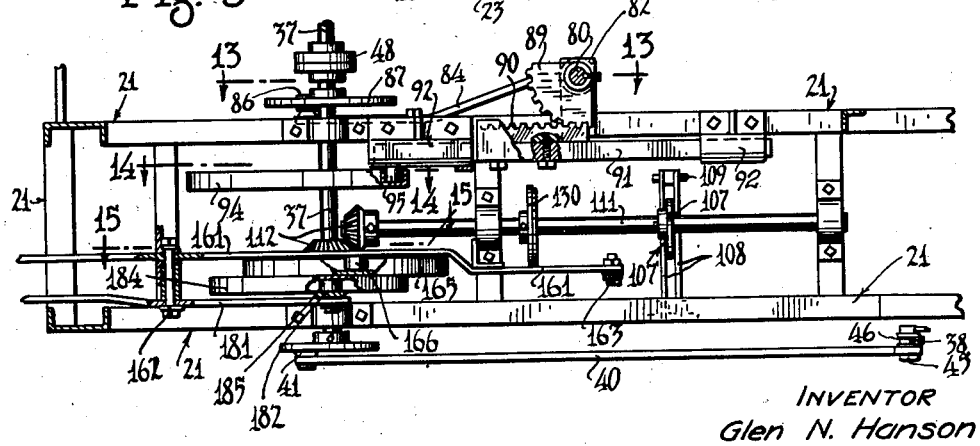
INVENTOR
Glen N. Hanson
By His Attorneys

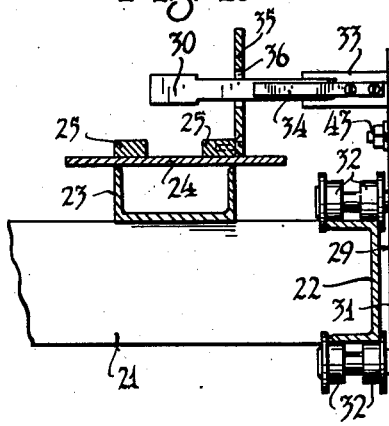

Patented Feb. 2, 1937

2,069,246

UNITED STATES PATENT OFFICE 2,069,246

LABEL AFFIXING MACHINE

Glen N. Hanson, Minneapolis, Minn.

Application December 7, 1934, Serial No. 756,386

4 Claims. (Cl. 216—55)

My invention has for its object the provision of a highly efficient machine for affixing labels to bottles, boxes, cans and other objects.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view looking at the improved machine from the front;

Fig. 2 is a rear elevation of the improved machine;

Fig. 3 is a plan view of the same;

Fig. 4 is a view partly in elevation and partly in transverse vertical section taken on the line 4—4 of Fig. 1;

Fig. 5 is a fragmentary view partly in plan and partly in longitudinal horizontal section taken on the line 5—5 of Fig. 2;

Fig. 6 is a fragmentary detail view with some parts sectioned on the line 6—6 of Fig. 1, on an enlarged scale;

Fig. 7 is a fragmentary view partly in elevation and partly in section taken on the line 7—7 of Fig. 2, on an enlarged scale;

Fig. 8 is a detail view with some parts sectioned substantially on the line 8—8 of Fig. 3, on an enlarged scale;

Fig. 9 is a view principally in transverse section taken on the line 9—9 of Fig. 3, on an enlarged scale;

Fig. 10 is a fragmentary detail view with some parts sectioned on the line 10—10 of Fig. 3, on an enlarged scale;

Fig. 11 is a front elevation of the label holder and fragmentarily illustrating the label pick-up and applying head, on an enlarged scale;

Fig. 12 is a left-hand elevation of the parts shown in Fig. 11;

Fig. 13 is a fragmentary detail view principally in side elevation with the drive shaft sectioned on the line 13—13 of Fig. 5;

Fig. 14 is a fragmentary detail view with some parts sectioned on the line 14—14 of Fig. 5;

Fig. 15 is a fragmentary detail view with some parts sectioned on the line 15—15 of Fig. 5;

Figs. 16 and 17 are fragmentary detail views with some parts sectioned on the lines 16—16 and 17—17 of Fig. 2, respectively, on an enlarged scale;

Fig. 18 is a view corresponding to Fig. 16 but showing a modified presser head;

Fig. 19 is a detail view showing a slight modification of the way; and

Fig. 20 is a detail view principally in section taken on the line 20—20 of Fig. 19.

The main frame of the improved machine is indicated as an entirety by the numeral 21, with the exception of two top longitudinal channel members 22, the flanges of which extend horizontally toward each other. Mounted on the frame 21 between and above the channel members 22 is a bed comprising a channel member 23, the flanges of which extend vertically upwardly, and a relatively wide flat plate 24 supported on said flanges and rigidly secured thereto. Supported on the bed 24 is a pair of long laterally spaced track rails 25. On the outer edges of the rails 25 is a plurality of apertured ears 26 that are frictionally clamped onto the bed 24 by hand-screws 27. These screws 27 extend through the apertured ears 26 and transverse slots 28 in the bed 24. Obviously, the screws 27 and slots 28 permit the rails 25 to be independently adjusted relative to each other to vary the width therebetween for holding bottles X of different transverse shapes and widths. The bottles X are laid on the bed 24 between the rails 25 which hold the same for straight line endwise sliding movement. In placing the bottles X on the bed 24 their bottoms are turned toward the discharge end of the machine or, in other words, the right-hand end of the machine with respect to a person facing the same at the front thereof and with the bottles engaging the one with the other in a row. This row of bottles X is moved by pressure applied to the last bottle placed on the bed 24, as will hereinafter appear.

A reciprocatory carriage 29, having a laterally and horizontally projecting arm 30, is provided for successively imparting step by step endwise movement to the row of bottles X. This carriage 29 includes a vertical frame 31 and upper and lower truck wheels 32 arranged to run on the upper and lower flanges of the rear frame member 22 with said frame outwardly of said member. It will be noted that the truckwheels 32 are in triangular arrangement, two of which are on the upper flange of the respective frame member 22 and the other of which is on the lower flange of said frame member, see Figs. 2 and 10.

The arm 30, which extends above the rails 25 and transversely thereof, has an expanded upper end portion arranged to engage the capped end of the last bottle X placed on the rails 25 and move the same, as well as the other bottles in the row, a distance equal to the full length of one of said bottles. Said arm 30 is pivoted to a bracket 33 on the frame 29 for horizontal swinging movement toward the receiving end of the rails 25. A flat spring 34, anchored to the bracket 33, normally holds the arm 30 with sufficient force to move the row of bottles X on the rails 25, but in case the movement of said row of bottles is stopped by an obstruction the spring 34 will yield and permit the arm 30 to swing clear of the engaged bottle X and thereby prevent damage to the machine.

A guard plate 35 is secured to the rear rail 25 on the outer side thereof and at a point where the bottles X are successively placed on the rails 25. This guard plate 35 is provided with a longitudinal slot 36 through which the arm 30 loosely works.

Reciprocatory movement is imparted to the carriage 29 from a drive shaft 37 by an upright lever 38, the upper arm of which is connected to the frame of said carriage by a short horizontal link 39 and the lower arm of which is connected by a horizontal pitman 40 to a crank 41 on the rear end of the shaft 37. The drive shaft 37 extends transversely of the frame 21 and is journaled in bearings on said frame. The lever 38 is pivoted to a bracket 42 on the frame 21 and the link 39 is adjustably connected to the frame of the carriage 29 by a nut-equipped bolt 43 which extends through a horizontal slot 44 in said frame. Obviously, by adjusting the link 39 relative to the carriage 29, the position to which the bottles X may be successively moved, relative to a label-applying head, on the rails 25 by the arm 30, may be varied, at will.

The pitman 40 is adjustably connected to the lever 38 by a nut-equipped bolt 45 which extends through a longitudinal slot 46 in said lever. Obviously, by adjusting the pitman 40 relative to the pivotal connection of the lever 38, the length of travel of said carriage 29 may be varied, at will. This adjustment is necessary to accommodate the machine to bottles of different lengths. The drive shaft 37 is driven direct from an electric motor 47, the armature shaft of which is connected to said drive shaft by a coupling 48. Said motor 47 is mounted on a support 49 rigidly secured to the frame 21 at the front of the machine.

The improved machine is provided with a label holder 50 which, as shown, is a flat table supported on the upper end of an upright post 51 which works through an aperture in a shelf 52 on a supplemental frame 53 mounted on the outer face of the front frame member 22 for vertical sliding movement. Said supplemental frame 53 is secured to the front frame member 22 by a clamping hand-screw 54 which extends through a vertical slot 55 in said supplemental frame and has screw-threaded engagement with the respective frame member 22. It will be noted, by reference to Fig. 3, that the intermediate portion of the front frame member 22 is inwardly offset as indicated by the numeral 56, and into which offset portion the supplemental frame 53 fits and thereby holds said frame for vertical straight line sliding movement and against pivotal movement on the hand-screw 54.

The post 51 is pivotally supported at its lower end on one end of a long horizontally disposed bar 57 pivotally attached at its other end to the supplemental frame 53 by a short depending pivotal link 58. The bar 57 is intermediately and yieldingly supported by a coiled spring 59 anchored to the supplemental frame 53 by a thumb-nut-equipped adjusting screw 60 held in an apertured lug 61 on said frame. This spring 59 is under strain to lift the post 51, and hence, the label holder 50. By adjusting the screw 60 the tension of the spring 59 may be varied, at will.

A pawl 62 and co-operating ratchet teeth 63, the latter of which is on the post 51, are provided for normally holding the label holder 50 against lifting movement by the spring 59. The pawl 62 is fixed to one end of a short rock shaft 64 journaled in depending bearings 65 on the underside of a shelf 52. Said rock-shaft 64 is intermittently operated by an upright trip rod 66 which works in a sleeve bearing 67 on the shelf 52 and is pivoted at its lower end to an arm 68 fixed to the other end of the rock shaft 64. Said pawl 62 is yieldingly held in engagement with the ratchet teeth 63 by a coiled spring 69 which encircles the trip rod 66 and is compressed between the bearing 67 and a collar 70 on said trip rod. On the other end of the trip rod 66 is a radially projecting finger 71, for a purpose that will presently appear.

A stack of labels Y are held centered on the table 50 by a plurality of upright rods 72 grouped about the post 51. These rods 72, at their lower ends, extend through slots and deep notches 73 in the shelf 52 and are held in upright positions by upper and lower collars 74. These slots and notches 73 extend radially from the axis of the post 51 and the collars 74 have working fit with the upper and lower surfaces of the shelf 52 and thereby frictionally hold the rods 72 where set. Said rods 72 also extend through deep radial notches 75 in the table 50 and hold said table and the post 51 against turning movement about the axis of said post. On the right-hand end of the supplemental frame 53 is a scale 76 and fixed to the front frame member 22 is a co-operating pointer 77. By the use of the scale 76 and the pointer 77, the supplemental frame 53 may be raised or lowered predetermined distances.

A suction head 78 is provided for picking up the uppermost label Y on the stack and applying the same to one of the bottles X. The suction head 78 is mounted on the downturned outer end of a horizontal tubular arm 79 carried by a vertical shaft 80 which extends through a hub on the inner end of said arm and is secured thereto by a set-screw. The shaft 80 is mounted in an upper bearing 81 on the front frame member 22 and a lower bearing 82 on the frame 21 for compound, endwise sliding movement and turning movement about its axis. On the lower end of the shaft 80 is a head 83 having a spherical under surface which rests on one arm of a lever 84 intermediately fulcrumed to a bearing 85 on the frame 21 and on the other arm of said lever is a cam roller 86 which bears on the periphery of a cam wheel 87 keyed to the drive shaft 37.

A coiled spring 88, encircling the shaft 80, is compressed between the lower bearing 82 and the head 83 and is under strain to move the shaft 80 downwardly and hold the lever 84 with its cam roller 86 lifted into engagement with the cam wheel 87 at the under surface thereof, see Fig. 3. The cam wheel 87 is adapted first, to lower the suction head 78, from its position shown in Fig. 11, onto the uppermost label Y; second, to lift said head with the label; third, to lower said head over one of the bottles X and apply the label thereto; and finally, to lift the head 78 from said bottle. The oscillatory swinging movement of the suction head 78, from its position shown in Fig. 3 to a position over a bottle X and then return the same to its position over the stack of labels Y, is accomplished by a toothed segment 89 and a cooperating rack 90, the former of which is keyed to the shaft 80 with freedom for said shaft to move endwise through said segment.

The rack 90 is secured to a bar 91 mounted in bearings 92 on the frame 21 and the segment 89 is held against axial movement with the shaft 80, during the endwise movement of said shaft, by the lower bearing 82 and a stop plate 93 on the bar 91 and which bearing and stop plate engage the upper and lower surfaces of said segment respectively. The rack 90 is reciprocated by a cam wheel 94 and a co-operating cam roller 95 journaled on the bar 91.

The cam wheel 94 is fixed to the drive shaft 37 and the stroke imparted to the rack 90, when moved by the cam wheel 94 toward the receiving end of the machine, is such as to swing the arm 79 from a position in which the suction head 78 is directly over the stack of labels Y to a position in which said head is directly over one of the bottles X on the rails 25 and properly positioned to apply a label to said bottle. During the return movement of the rack 90, in which it is moved toward the delivery end of the machine by the cam wheel 94, the arm 79 moves the suction head 78 from its label-applying position to its label pick-up position.

Referring again to the label holding table 50 and in respect to the operation of the pawl 62, it will be noted, by reference to Fig. 12, that the finger 71 on the trip rod 66 extends transversely under the arm 79 when said arm is set to position the suction head 78 over the stack of labels Y. Each time the cam wheel 87 moves the arm 79 downwardly, when in a label pick-up position, it positions the suction head 78 on the uppermost label Y in the stack on the table 50. During this movement of the arm 79 it engages the underlying finger 71, presses the trip rod 66 endwise downwardly to operate the rock shaft 64 and move the pawl 62 out of engagement with the engaged ratchet tooth 63 and at which time the engagement of the suction head 78 with the stack of labels Y holds the table 50 against lifting movement by the spring 59.

When the arm 79 is moved upwardly by the cam wheel 87 it lifts the head 78 from the stack of labels Y, releases the finger 71 and allows the spring 59 to return the pawl 62 to an operative position to again hold the table 50 against the lifting action of the spring 59. It is evident that a plurality of labels Y will have to be removed from the stack before the pawl 62, when returned to an operative position, will engage the next lowest ratchet tooth 63 and position the table 50 at a slightly higher elevation. It is also evident that the rods 72 may be very quickly and easily adjusted to hold a stack of labels Y of different forms and sizes. The label-holding assembly may be raised or lowered relative to the suction head 78 by adjusting the supplemental frame 53 on the main frame 21.

Suction is intermittently produced in the suction head 78 by a pump 96 driven from an electric motor 97 by a belt 98 and the control switch to said motor is designated by the numeral 99. The pump 96 is mounted on a support 100 attached to the main frame 21, at the receiving end of the machine, and the motor 97 is mounted on the main frame 21. A vacuum tank 101 is mounted on the main frame 21 at the receiving end of the machine and is connected to the pump 96 by a hose 102. The vacuum tank 101 is provided with the valve 105, at the time the picked-up label is a pipe 104 on the outer end of which is the casing of an oscillatory valve 105 and which valve casing is connected by a hose 106 to the tubular arm 97. The valve 105 is operated by a cam 107 and a cooperating cam roller 107' journaled on a lever 108 intermediate of its ends.

One end of the lever 108 is pivoted to the main frame 21 and its other end is connected by a long link 109 to an arm 110 on the stem of the valve 105. The cam 107 is fixed to a counter-shaft 111 journaled in bearings on the main frame 21 and which shaft is driven by bevel gears 112 from the drive shaft 37. The timing of the cam 107 is such as to open the valve 105 to produce suction in the head 78, at the time it is lowered onto the uppermost label Y on the stack and pick-up said label. Said cam 107 is also timed to close a gauge 103. Leading from the vacuum tank 101 is applied to a bottle by the head 78, and release said label.

During the movement of the suction head 78 from its label pick-up position to its label-applying position, it is carried over an upright liquid spraying head 113 for spraying the underside or back of a label, held by the suction head 78, with liquid, to wit: glue, provided the label has not previously been supplied with glue, or with water to moisten a label having glue on its back at the time it is placed on the table 50.

The spraying head 113 includes an air nozzle 114 and a liquid nozzle 115, the latter of which is within the mixing chamber of the air nozzle 114 and axially aligned with said nozzle. Air is delivered into the mixing chamber of the air valve 114 from a compression tank 116 through a pipe 117 leading from said tank to an intake chamber 118 in a valve casing 119 secured to the main frame 21 by a bracket 119'. A hose 120 connects an air chamber 121 in the valve casing 119 with the mixing chamber of the air valve 114. A port 122 connects the two chambers 118 and 121 and a vent 123 in the valve casing 119 leads from the chamber 121 to atmosphere.

Mounted in the two chambers 118 and 121 are two slide valves 124 and 125, respectively. An L-shaped port 126 in the valve 124 affords a communicating passageway from the chamber 118 to the port 122 in one extreme position of the valve and to close the chamber 118 to the port 122 in the other extreme position of said valve. A T-shaped port 127 in the valve 125 affords a communicating passage that connects the port 122 to the chamber 123 in one extreme position of said valve and at which time the valve 125 closes the vent 123. In the other extreme position of the valve 125 the port 127 affords a communicating passageway from the chamber 121 to the vent 123 and at which time the valve 125 closes the port 122.

The slide valves 124 and 125 are simultaneously but reversely operated by a lever 128 intermediately fulcrumed to the underside of the valve casing 119 and on which lever the lower ends of the valves 124 and 125 loosely rest, one on each side of said fulcrum. Journaled on one end of the lever 128 is a cam roller 129 which is yieldingly held on the periphery of the cam wheel 130 by a coiled spring 131 attached to the other end of the lever 128 and anchored to the valve casing 119. The cam wheel 130 is provided with a pair of adjustable segmental plates 132 for varying the timing of the valves 124 and 125. Said cam wheel 130 is mounted on the counter-shaft 111 and keyed thereto.

The liquid nozzle 115 is normally closed by an upright needle valve 133 having on its lower end a piston 134 which works in a co-operating cylinder 135 integral with the valve head 113. A coiled spring 136 compressed between the lower end of the cylinder 135 and the piston 134, normally and yieldingly holds the needle valve 133 closed. The piston 134 is operated by air, to open the needle valve 133 against the tension of the spring 136, from the compression tank 116. A hose 137 having the same connection with the valve casing 119 as the hose 120, leads to the spraying head 113 and has communication with the cylinder 135 above the piston 134 through a port 138 in said spraying head.

Air to the nozzle 114 and to the cylinder 135 is controlled by the same means, to wit: the valves 124 and 125. The pipe 117 between the compression tank 116 and the valve casing 119 is provided with a presser gauge 139 and a relief valve 140. A cut-off valve 141 is interposed in the pipe 117 between the compression tank 116 and the gauge 139 and the valve 140.

Mounted on the front frame member 22 is a glue supply tank 142 and a water supply tank 143 and which tanks have communication, the one with the other, above the level of liquid therein through a short air pipe 144. The liquid in the tanks 142 and 143 is held under pressure by air from the compression tank 116.

A branch air pipe 145, leading from the pipe 117, is tapped into the water supply tank 143 substantially at the same level as the pipe 144. Glue and water are conveyed from the supply tanks 142 and 143, respectively, through hose connections 146 and 147, respectively, to a chamber in a common valve casing 148. Said valve casing 148 is attached to the spraying head 113 and its chamber has communication with the chamber in the liquid nozzle 115 through a port 149 in said head.

Mounted in the valve casing 148 are two cut-off valves 150 and 151 for independently opening or closing the connections to the hose 146 and 147, respectively. It is, of course, understood that one of the valves 150 or 151 is always closed while the other one is open, depending upon whether glue or water is being supplied to the spraying head 113.

The row of bottles X on the rails 25 remains stationary while a label Y is being applied to one of the bottles X in said row and said row of bottles continues to remain stationary until the suction head 78 has applied a label to the bottle and moved away from the same and thereafter the applied label is pressed onto the bottle by a presser head 152. This head 152 has an upstanding stem 153 mounted in a bearing arm 154 on a cross-head 155 mounted on a pair of guide posts 156 anchored to the rear frame member 22 and which posts are tied together in parallel arrangement by a plate 157.

The arm 154 is detachably secured to the cross-head 155 by a hand-nut equipped bolt 158 and the stem 153 is adjustably secured to the arm 154 for axial turning movement and endwise sliding movement by a set-screw 159. Applied to the underside of the presser head 152 is a thick facing 160 of sponge rubber for direct contact with a label and a bottle to which said label is applied. The head 152 and facing 160 are V-shaped in cross-section to fit more closely over and around a round bottle. Obviously, the thick sponge rubber of which the facing 160 is made will yield and closely fit around a bottle and applied label and apply pressure to the label over its entire area. The cross-head 155 is reciprocated by a lever 161 intermediately fulcrumed at 162 to the main frame 21. A link 163 pivotally connects one end of the lever 161 to the cross-head 155 and a counter-weight 164 is secured to the other end of said lever.

The lever 161 is actuated by a cam wheel 165 and a co-operating cam roller 166, the former of which is keyed to the drive shaft 37 and the latter of which is journaled on the lever 161 intermediate of the fulcrum 162 and the link 163. When the presser head 152 is lifted from a bottle, said bottle is given thereafter three more successive steps of movement by the arm 30 and each of said movements, as previously stated, is equal to the full length of one of the bottles. During each rest period between the next three steps of movement of a bottle from the position in which the label was pressed thereon by the head 152, said label is successively pressed onto the bottle first, by a presser head 167, identical with the presser head 152, and second and finally by flexible sheets 168 of any suitable material. The flexible sheets 168 in addition to pressing a label on a bottle also transversely smooth the same from its center toward its outer edges.

The stem and facing of the presser head 167 are designated by the numerals 169 and 170, respectively. Each sheet 168 is secured at its ends to one of the ends of a pair of wide fingers 171 intermediately fulcrumed to a presser head 172 and the other end of each finger 171 is yieldingly connected by a coiled spring 173 to said head. Each head 172 is secured to the lower end of a stem 174 and the two stems 174 are mounted, as well as the stem 169, each in an arm 175 to which they are adjustably secured by set-screws 176. The arms 175 are detachably and adjustably secured by hand-nut equipped bolts 177 which extend through a horizontal slot 178 in a cross-head 179 mounted on a pair of guide posts 180 anchored to the rear frame member 22. The slot 178 permits the arms 175 to be adjusted toward or from each other and toward or from the arm 154 to position the pressure devices for bottles of different lengths.

The cross-head 179 is reciprocated by a lever 181 intermediately mounted on the same fulcrum as the lever 161, to wit: 162, and a link 182 connects one end of the lever 181 to the cross-head 179 and a counter-weight 183 is secured to the other end of the lever 181. Said lever 181 is oscillated by a cam wheel 184 and a co-operating cam roller 185, the former of which is keyed to the drive shaft 37 and the latter of which is journaled on the pivot connecting said shaft to the link 181. A keeper 186 on the main frame 21 holds the link 182 for straight endwise movement.

After a bottle has been moved from under the last presser head 172, it slides down an apron 187, on the delivery end of the machine, and onto an endless carrier 188.

The control switch for the motor 47 is designated by the numeral 189.

All surplus glue or water that is blown beyond a label carried by the suction head 78 is deflected from the machine by an electric fan 190 mounted on the rear frame member 22.

In Fig. 18 a label Y is being applied to the transverse concave side of a bottle Z and to efficiently apply this label a modified presser head 191 is used. This head 191 is horizontally flat and its sponge rubber facing 192 is also flat. Obviously, the facing 192 will form itself over the peculiarly shaped face of the bottle Z and press the label Y thereon.

To apply labels to tapered bottles Z as shown in Figs. 19 and 20, it is desirable to support such bottles on the bed 24 with their upper surfaces substantially parallel to said bed. To accomplish this result, pairs of longitudinally spaced wedge-like blocks 193 are provided for the bottle Z' when placed in the row on the bed 24. The blocks 193 are detachably secured to the rails 25 by pins 194 that project into holes in said rails.

*Operation*

The operation of the improved machine may be briefly described as follows: Bottles are successively placed on the bed 24 between the rails 25, either by hand or by a suitable feed device, not shown, and with the capped ends of the bottles turned toward the receiving end of the machine. The delivery of a bottle to the machine is at the time the arm 79 is in its rearmost position so that the bottle will be forward thereof. Labels to be applied to the bottles are placed on the table 50 and held as previously described.

During each cycle of operation of the machine, which occurs during each rotation of the drive shaft 37, the row of bottles X is given a step by step movement on the bed 24, the arm 79 is moved first from its position shown in Fig. 11, downwardly to permit the suction head 78 to pick up the uppermost label Y; second, it is raised and swung laterally to position said head over one of the bottles; third, the arm 79 is lowered to apply the label to the respective bottle; and fourth, said arm is raised and swung laterally to its original position, as shown in Fig. 11. During this movement of the arm 79 the valve 110 is opened to permit partial vacuum in the tank 101 to produce suction in the head 78 and thereby pick up a label and then said valve is closed to release the label when applied to the bottle. At the time the arm 79 is being swung from a position in which the head 78 is in a label pick-up position to a label-applying position, the valves 124—125 are operated to cause air to flow to the nozzle 113 and either glue or water to flow to the spraying nozzle 115, depending on which valve 150—151 is open, and thereby spray the underside of the label held by the head 78. After the head 78 has been moved away from a bottle, to which a label has been applied, the head 152 is depressed and its yielding face presses the label onto the bottle.

During the next three cycles of the machine, the label is firmly pressed onto the bottle and smoothed first by the yielding face on the head 167 and thereafter by the two flexible sheets 168 on the heads 172. By spraying glue onto a label just prior to its application to a bottle, very little glue is required to securely hold the label.

Referring again to the suction head or cup 78, the same is surrounded by an annular pressure foot 78' having a horizontally disposed flat annular ring carried by a plurality of circumferentially spaced arms on a collar secured to the arm 79. This pressure foot 78' is spaced from the head 78 to permit free movement of said head therein. It is important to note that normally the bottom of the pressure foot 78' is below the bottom of the head 78 so that at the time the arm 79 is being lowered to permit the suction head 78 to pick up the uppermost label Y on the stack, said pressure foot will engage the stack first and at the marginal portion thereof and thereby compress said stack causing the central portions of the labels to bulge upwardly within the pressure foot 78' and thereby position the uppermost label to be engaged by the suction head 78.

It will be understood that the invention described is capable of various modifications within the scope of the invention herein disclosed and claimed.

What I claim is:

1. A machine of the class described having an article holder, a label holder, an upright post mounted for compound endwise movement and turning movement about its axis and having a radial arm, a suction head on the arm for picking up a label on the label holder and applying the same to an article on the article holder, means for successively producing suction in said head for a predetermined period of time, means for turning the post to alternately position the suction head relative to the label holder and the article holder, a spring under strain to move the post downwardly, cam-actuated means for lifting the post at predetermined intervals against the tension of said spring, a nozzle for spraying a label picked up by said head with a liquid during the movement of the arm from the label holder to the label applying position of the suction head, and means for opening and closing the nozzle in timed relation to the cam-actuated means.

2. A machine of the class described having a longitudinal way for slidably holding a plurality of articles in a row in which they directly engage the one with the other, a label holder, movable means for picking up a label on the label holder and applying the same to one of the articles in the row, means operative on the last article placed in the row for intermittently moving the row a step forward corresponding to the length of one of the articles in the row, whereby the articles are successively positioned in predetermined position relative to the movable means when in a label applying position, and means for pressing an applied label on an article after the movable means has been moved from its label applying position and before the respective article has been moved from said predetermined position.

3. In a label applying machine, the combination with means for feeding articles in a row, a label holder laterally remote from said row, a label pick up and transfer device arranged to pick up the labels one at a time from said holder and to carry the same edgewise to an article in the row, and means operative at an angle to the label-delivery movement for pressing the same onto the article, said label-carrying and pressing devices being independent elements, the latter being operative to press the label after the label-carrier has moved from the delivery position.

4. The structure defined in claim 3 in further combination with means for further pressing the labels onto the articles after the latter have been moved from label-receiving positions.

GLEN N. HANSON.